(12) United States Patent
Okawa et al.

(10) Patent No.: US 12,400,056 B2
(45) Date of Patent: Aug. 26, 2025

(54) SIMULATION OF LIQUID OBJECTS MANIPULATED BY ROBOTS USING SUPERVISED LEARNING

(71) Applicant: OMRON Corporation, Kyoto (JP)

(72) Inventors: Yohei Okawa, Koshigaya (JP); Yoshiya Shibata, Tokyo (JP); Chisato Saito, Tokyo (JP); Kennosuke Hayashi, Tokyo (JP); Kin Chung Denny Fu, Kyoto (JP); Yuki Yamaguchi, Nara (JP)

(73) Assignee: OMRON Corporation, Kyoto (JP)

( * ) Notice: Subject to any disclaimer, the term of this patent is extended or adjusted under 35 U.S.C. 154(b) by 1006 days.

(21) Appl. No.: 17/269,531

(22) PCT Filed: Oct. 11, 2019

(86) PCT No.: PCT/JP2019/040142
§ 371 (c)(1),
(2) Date: Feb. 19, 2021

(87) PCT Pub. No.: WO2020/075834
PCT Pub. Date: Apr. 16, 2020

(65) Prior Publication Data
US 2021/0182459 A1    Jun. 17, 2021

(30) Foreign Application Priority Data
Oct. 11, 2018 (JP) .................. 2018-192393

(51) Int. Cl.
*G06F 30/25* (2020.01)
*B25J 9/16* (2006.01)
(Continued)

(52) U.S. Cl.
CPC ............. *G06F 30/27* (2020.01); *G06F 30/25* (2020.01); *G06N 20/00* (2019.01); *B25J 9/1605* (2013.01);
(Continued)

(58) Field of Classification Search
CPC ...... G06F 30/25; G06F 30/27; G06F 2113/08; G06F 30/23; G06N 20/00; G06N 3/084;
(Continued)

(56) References Cited

U.S. PATENT DOCUMENTS 7,565,276 B2 *   7/2009   Song ....................... G06F 30/23
                                                         703/9
9,038,961 B2 *   5/2015   Deslandes ............... G06F 30/15
                                                         701/4
(Continued)

FOREIGN PATENT DOCUMENTS

CN    104484522    4/2015
CN    105583823    5/2016
(Continued)

OTHER PUBLICATIONS

Li, Y., et al. "Learning Particle Dynamics for Manipulating Rigid Bodies, Deformable Objects, and Fluids" arXiv:1810.01566v1 (Oct. 3, 2018) (Year: 2018).*
(Continued)

*Primary Examiner* — Jay Hann
(74) *Attorney, Agent, or Firm* — JCIPRNET (57) ABSTRACT

A simulation device that reduces the computation load required for simulation of the movement of an operation subject is provided. The simulation device includes a processor configured to set framing conditions for a model representing the operation subject, set conditions for external force applied to the operation subject, simulate the movement of the operation subject under the framing conditions and the conditions for external force, generate learning data that includes data representing the framing conditions, the conditions for external force, and the movement of representative points located on the surface of the operation subject during simulation of the movement of the operation subject, and by supervised learning using the learning data,
(Continued)

generate a learning model that takes the framing conditions, the conditions for external force, and the initial conditions of the representative points as input and outputs data representing the movement of the representative points.

7 Claims, 7 Drawing Sheets

(51) Int. Cl.
  *G06F 30/27* (2020.01)
  *G06F 113/08* (2020.01)
  *G06N 20/00* (2019.01)
  *G05B 17/02* (2006.01)
(52) U.S. Cl.
  CPC .............. *B25J 9/163* (2013.01); *B25J 9/1671* (2013.01); *G05B 17/02* (2013.01); *G05B 2219/40073* (2013.01); *G06F 2113/08* (2020.01)
(58) Field of Classification Search
  CPC ........ B25J 9/1605; B25J 9/163; B25J 9/1671; G05B 17/02; G05B 2219/40073
  See application file for complete search history.

(56) References Cited

U.S. PATENT DOCUMENTS

| | | | |
|---|---|---|---|
| 9,111,056 B2* | 8/2015 | Hong | ..................... G06F 30/20 |
| 2007/0010342 A1 | 1/2007 | Sato et al. | |
| 2018/0222057 A1 | 8/2018 | Mizobe et al. | |

FOREIGN PATENT DOCUMENTS

| | | |
|---|---|---|
| CN | 107877528 | 4/2018 |
| JP | 2006275722 | 10/2006 |
| JP | 2008542888 | 11/2008 |
| JP | 2010198399 | 9/2010 |
| JP | 2011081530 | 4/2011 |
| JP | 2014184516 | 10/2014 |
| JP | 2014238828 | 12/2014 |
| JP | 2018126799 | 8/2018 |

OTHER PUBLICATIONS

Bates, C., et al. "Modeling human intuitions about liquid flow with particle-based simulation" arXiv:1809.01524v1 (Sep. 2018) (Year: 2018).*
Li, Y., et al. "Propagation Networks for Model-Based Control Under Partial Observation" arXiv:1809.11169.v1 (Sep. 28, 2018) (Year: 2018).*
Schenck, C. & Fox, D. "SPNets: Differentiable Fluid Dynamics for Deep Neural Networks" 2nd Conf. on Robot Learning, Published as PMLR Proceedings of Machine Learning Research, vol. 87, (Oct. 29-31, 2018) (Year: 2018).*
Schenck, C. & Fox, D. "Reasoning About Liquids via Closed-Loop Simulation" arXiv:1703.01656v2, Proceedings of Robotics: Science & Systems (RSS) (2017) (Year: 2017).*
Takanori Shibata et al., "Hierarchical Intelligent Control for Robotic Motion," IEEE Transactions on Neural Networks, vol. 5, Sep. 1994, pp. 823-832.
A. Robertsson et al., "Cascaded Iterative Learning Control for Improved Task Execution of Optimal Control," Proceedings of the 2002 IEEE International Conference on Robotics & Automation, vol. 2, May 2002, pp. 1290-1295.
Suei Jen Chen et al., "Using Acceleration Compensation to Reduce Liquid Surface Oscillation During a High Speed Transfer," 2007 IEEE International Conference on Robotics and Automation, Apr. 2007, pp. 2951-2956.
Wisnu Aribowo et al., "Input Shaping Control to Suppress Sloshing on Liquid Container Transfer Using Multi-Joint Robot Arm," The 2010 IEEE/RSJ International Conference on Intelligent Robots and Systems, Oct. 2010, pp. 3489-3494.
"Search Report of Europe Counterpart Application", issued on Jun. 3, 2022, p. 1-p. 12.
"Office Action of China Counterpart Application", issued on Dec. 7, 2023, with English translation thereof, p. 1-p. 12.
"International Search Report (Form PCT/ISA/210) of PCT/JP2019/040142," mailed on Jan. 7, 2020, with English translation thereof, pp. 1-4.
"Written Opinion of the International Searching Authority (Form PCT/ISA/237) of PCT/JP2019/040142," mailed on Jan. 7, 2020, with English translation thereof, pp. 1-6.
JKU Johannes Kepler et al., "Smoothed particle hydrodynamics with consistent boundaries for fluid-structure interaction", Technisch-Naturwissenschaftliche Fakultät, Oct. 15, 2015, pp. 1-253.
John T Feddema et al., "Control for Slosh-Free Motion of an Open Container", IEEE Control Systems Magazine, Feb. 1997, pp. 29-36.
J.R. Shao et al., "An improved SPH method for modeling liquid sloshing dynamics", Computers and Structures, Mar. 12, 2012, pp. 18-26, vol. 100-101.
"Office Action of Europe Counterpart Application", issued on Jul. 1, 2025, p. 1-p. 7.

* cited by examiner

SIMULATION OF LIQUID OBJECTS MANIPULATED BY ROBOTS USING SUPERVISED LEARNING

CROSS-REFERENCE TO RELATED APPLICATION

This application is a 371 application of the International PCT application serial no. PCT/JP2019/040142, filed on Oct. 11, 2019, which claims the priority benefits of Japan Patent Application No. 2018-192393, filed on Oct. 11, 2018. The entirety of each of the above-mentioned patent applications is hereby incorporated by reference herein and made a part of this specification.

TECHNICAL FIELD

The present invention relates to a simulation device, a simulation method, and a computer-readable storage medium.

BACKGROUND ART

In the related art, various processes have been performed on operation subjects by robots in some cases. Actions of robots have been verified by simulations and designs have been created with reference to simulation results in some cases.

For example, Patent Literature 1 discloses a method of simulating an action of an industrial machine and storing or comparing a simulation result with actual data from the action of the industrial machine.

CITATION LIST

Patent Literature

[Patent Literature 1]
Published Japanese Translation No. 2008-542888 of the PCT International Publication

SUMMARY OF INVENTION

Technical Problem

When an operation subject manipulated by a robot is a liquid or a flexible object that has flexibility, movement of the operation subject is simulated along with movement of the robot in some cases. The movement of the operation subject can be simulated by a known technology such as a finite element method or a particle method.

However, when movement of an operation subject is simulated with high accuracy, a computation load becomes large and a time necessary for the simulation becomes long in some cases.

Accordingly, the present invention provides a simulation device, a simulation method, and a computer-readable storage medium for reducing a computation load required for simulation of movement of an operation subject.

Solution to Problem

According to an aspect of the present disclosure, a simulation device includes: a first setting unit configured to set framing conditions for a model representing an operation subject; a second setting unit configured to set conditions for external force applied to the operation subject; a first simulation unit configured to simulate movement of the operation subject under the framing conditions and the condition for external force; a generation unit configured to generate learning data including the framing conditions, the conditions for external force, and data representing movement of a plurality of representative points located on a surface of the operation subject during simulation by the first simulation unit; and a learning unit configured to, by supervised learning using the learning data, generate a learning model that takes the framing conditions, the conditions for external force, and initial conditions of the plurality of representative points as input and outputs the data representing the movement of the plurality of representative points.

According to the aspect of the present disclosure, by simulating movement of the model representing the operation subject in conformity with any scheme and generating the learning model by supervised learning using a simulation result, it is possible to substitute a simulation having a large computation load with a prediction of the movement of the representative points by the learning model having a relatively small computation load. Thus, it is possible to reduce a computation load required for simulation of the movement of the operation subject.

In the simulation device according to the aspect of the embodiment, the generation unit may generate the learning data that includes the framing conditions, the conditions for external force at a predetermined time of the simulation by the first simulation unit, and data representing movement of the plurality of representative points at the predetermined time as input data and includes data representing movement of the plurality of representative points at a time after a predetermined time passes from the predetermined time as output data.

According to the aspect of the present disclosure, it is possible to predict the movement of the representative points after the predetermined time passes by the learning model. By repeatedly performing the prediction by the learning model, it is possible to predict the movement of the representative points at any time.

The simulation device according to the aspect of the embodiment may further include a second simulation unit configured to simulate movement of a robot; and a prediction unit configured to input the framing conditions and conditions for external force added to the operation subject by the robot during simulation by the second simulation unit to the learning model and configured to predict movement of the plurality of representative points. The second simulation unit may combine the movement of the plurality of representative points predicted by the prediction unit and the simulated movement of the robot.

According to the aspect of the present disclosure, by predicting the movement of the representative points representing the operation subject with a relatively small computation load by the learning model and combining movement of the robot with a simulation result in conformity with any scheme, it is possible to reduce a computation load required for entire simulation including the robot and the operation subject.

In the simulation device according to the aspect of the embodiment, the operation subject may include one of a flexible object, a liquid, and a gas.

According to the aspect of the present disclosure, even for an operation subject in which a computation load of simulation is large, it is possible to predict the movement of the representative points of the operation subject through computation with a learning model having a relatively small computation load. Thus, it is possible to reduce a computation load required for simulation of movement of the operation subject.

In the simulation device according to the aspect of the embodiment, when the operation subject is a liquid, the surface of the operation subject may be a liquid surface of the liquid and the movement of the plurality of representative points may be indicated by movement of the liquid surface in a perpendicular direction of the liquid surface at a plurality of positions.

According to the aspect of the present disclosure, by predicting movement of the plurality of representative points located on the liquid surface of the liquid with the learning model, it is possible to further reduce the computation load of the learning model than in the case of prediction of movement of the entire liquid.

In the simulation device according to the aspect of the embodiment, the first simulation unit may use the model obtained by decomposing the liquid into a plurality of particles to simulate movement of the plurality of particle. The data representing the movement of the plurality of representative points may be data representing movement of some particles located on the liquid surface of the liquid at a predetermined time of simulation by the first simulation unit among the plurality of particles.

According to the aspect of the present disclosure, it is possible to generate the learning model for reproducing movement of the particles located on the liquid surface in a result obtained by simulating movement of the entire liquid by the particle model. Thus, it is possible to further reduce the computation load of the learning model than in the case of prediction of movement of the entire liquid.

In the simulation device according to the aspect of the embodiment, the framing conditions may include one of a condition representing flexibility of the operation subject and a condition representing viscosity.

According to the aspect of the present disclosure, even for an operation subject in which a computation load of simulation is large, it is possible to predict the movement of the representative points of the operation subject through computation with a learning model having a relatively small computation load. Thus, it is possible to reduce a computation load required for simulation of movement of the operation subject.

In the simulation device according to the aspect of the embodiment, the first simulation unit may use the model obtained by decomposing the operation subject into a plurality of constituents connected by nodal points to simulate movement of the nodal points. The number of plurality of representative points may be less than the number of nodal points.

According to the aspect of the present disclosure, it is possible to generate the learning model for reproducing movement of the nodal points located on the surface of the operation subject in a result obtained by simulating movement of the entire operation subject in accordance with a finite element method. Thus, it is possible to further reduce the computation load of the learning model than in the case of prediction of movement of all the nodal points representing the operation subject.

According to another aspect of the present disclosure, a simulation method includes: setting framing conditions for a model representing an operation subject; setting conditions for external force applied to the operation subject; simulating movement of the operation subject under the framing conditions and the conditions for external force; generating learning data including the framing conditions, the conditions for external force, and data representing movement of a plurality of representative points located on a surface of the operation subject during simulation; and generating, by supervised learning using the learning data, a learning model that takes the framing conditions, the conditions for external force, and initial conditions of the plurality of representative points as input and outputs the data representing the movement of the plurality of representative points.

According to the aspect of the present disclosure, by simulating the movement of the model representing the operation subject in accordance with any scheme and generating the learning model by supervised learning using the simulation result, it is possible to substitute a simulation having a large computation load with a prediction of the movement of the representative points by a learning model having a relatively small computation load. Thus, it is possible to reduce a computation load required for simulation of the movement of the operation subject.

According to still another aspect of the present disclosure, a computer-readable storage medium storing a simulation program causes a processor included in a simulation device to function as: a first setting unit configured to set framing conditions for a model representing an operation subject; a second setting unit configured to set conditions for external force applied to the operation subject; a first simulation unit configured to simulate movement of the operation subject under the framing conditions and the condition for external force; a generation unit configured to generate learning data including the framing conditions, the conditions for external force, and data representing movement of a plurality of representative points located on a surface of the operation subject during simulation by the first simulation unit; and a learning unit configured to, by supervised learning using the learning data, generate a learning model that takes the framing conditions, the conditions for external force, and initial conditions of the plurality of representative points as input and outputs the data representing the movement of the plurality of representative points.

According to the aspect of the present disclosure, by simulating the movement of the model representing the operation subject in accordance with any scheme and generating the learning model by supervised learning using the simulation result, it is possible to substitute a simulation having a large computation load with a prediction of the movement of the representative points by a learning model having a relatively small computation load. Thus, it is possible to reduce a computation load required for simulation of the movement of the operation subject.

Advantageous Effects of Invention

The present invention provides a simulation device, a simulation method, and a computer-readable storage medium for reducing a computation load required for simulation of movement of an operation subject.

DESCRIPTION OF EMBODIMENTS

Hereinafter, a mode related to an aspect of the present invention (hereinafter referred to as an "embodiment") will be described with reference to the drawings. In each diagram, units denoted by the same reference numerals have the same or similar configurations.

§ 1 Application Example

Figure 1:
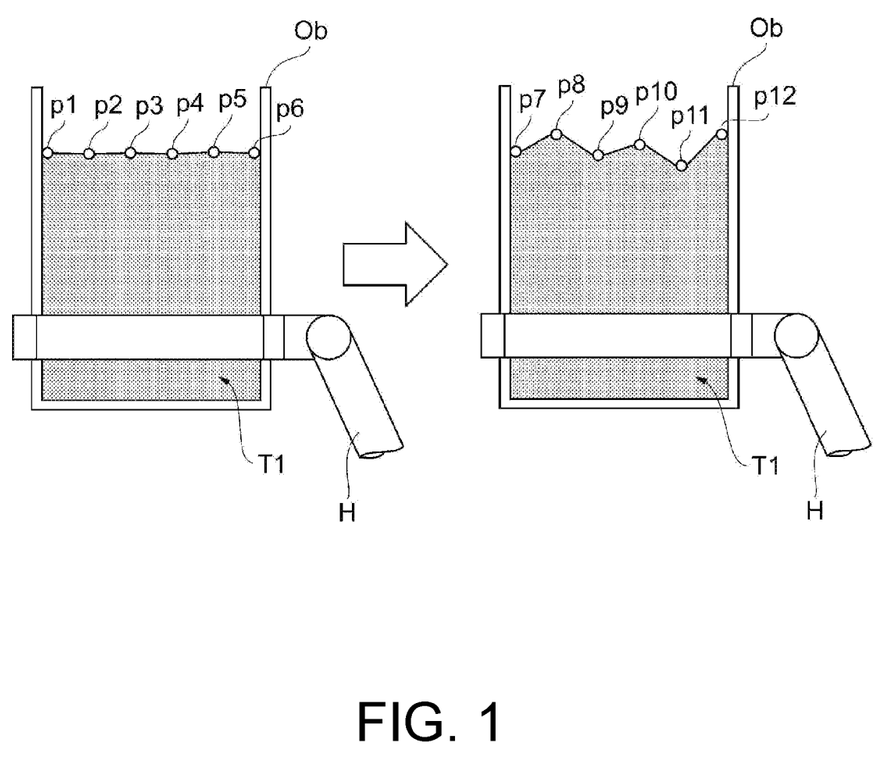
FIG. 1 is a schematic diagram illustrating movement of a first operation subject simulated by a simulation device according to an embodiment of the present invention.

FIG. 1 is a schematic diagram illustrating movement of a first operation subject T1 simulated by a simulation device 10 according to an embodiment of the present invention. The first operation subject T1 is a liquid contained in a container object Ob. The container object Ob is gripped by a robot hand H and operates. When the robot hand H is caused to grip and move the container object Ob, the simulation device 10 simulates an action of the robot hand H caused to move the container object Ob over a short time so that the first operation subject T1 which is a liquid does not spill from the container object Ob. In FIG. 1, the first operation subject T1 which is in a still state is illustrated to the left and the first operation subject T1 of which a liquid surface is shaken due to an operation of the container object Ob by the robot hand H is illustrated to the right.

The simulation device 10 sets framing conditions for a model representing the first operation subject T1 and conditions for external force applied to the first operation subject T1, and simulates movement of the first operation subject T1 in conformity with a known simulation scheme under these conditions. For example, the simulation device 10 may simulate movement of a plurality of particles in conformity with a so-called particle method using a model obtained by decomposing the first operation subject T1 which is a liquid into a plurality of particles. In this case, the framing conditions for the model may include conditions for determining interaction between particles and particle diameters. The conditions for external force may include conditions for force added by the robot hand H and a boundary condition by the container object Ob.

The simulation device 10 may use, as learning data, data representing movement of some particles located on the liquid surface of the first operation subject T1 in movement of a plurality of particles simulated in conformity with the particle method. Here, the data representing movement of the particles may include data representing at least one of the positions, speeds, momenta, and accelerations of the particles. When an operation subject is a liquid like the first operation subject T1, the surface of the operation subject may be a liquid surface of the liquid and movement of a plurality of representative points may be represented by movement of the liquid surface at a plurality of positions in the perpendicular direction. For example, the simulation device 10 may partition the inside of the container object Ob into 3-dimensional lattice, may select a particle with the largest value in the Z direction (the perpendicular direction) with respect to each lattice cell of the XY plane crossing the container object Ob, may repeat a process of setting the XYZ coordinates of the particle as one representative point, and may generate data representing movement of some particles located on the liquid surface of the first operation subject T1.

In FIG. 1, a first particle p1, a second particle p2, a third particle p3, a fourth particle p4, a fifth particle p5, a sixth particle p6, a seventh particle p7, an eighth particle p8, a ninth particle p9, a tenth particle p10, an eleventh particle p11, and a twelfth particle p12 are illustrated as some particles located on the liquid surface of the first operation subject T1. The first particle p1, the second particle p2, the third particle p3, the fourth particle p4, the fifth particle p5, the sixth particle p6, the seventh particle p7, the eighth particle p8, the ninth particle p9, the tenth particle p10, the eleventh particle p11, and the twelfth particle p12 are representative points located on the liquid surface of the first operation subject T1 at a certain time. Here, the particles located on the liquid surface of the first operation subject T1 may be changed moment by moment and may not necessarily be the same particles. In this example, when the container object Ob is operated by the robot hand H, a left state in which the heights of the first particle p1, the second particle p2, the third particle p3, the fourth particle p4, the fifth particle p5, and the sixth particle p6 are substantially the same transitions to a right state in which the liquid is stirred, the particles located on the liquid surface of the first operation subject T1 have changed, and the heights of the seventh particle p7, the eighth particle p8, the ninth particle p9, the tenth particle p10, the eleventh particle p11, and the twelfth particle p12 vary.

The simulation device 10 generates learning data including framing conditions for a model representing the first operation subject T1, conditions for external force applied to the first operation subject T1, and data representing movement of the plurality of representative points (the first to twelfth particles or the like) located on the liquid surface of the first operation subject T1 during simulation. The simulation device 10 generates, by supervised learning using the learning data, a learning model that takes the framing conditions for the model representing the first operation subject T1, the conditions for external force applied to the first operation subject T1, and initial conditions of the plurality of representative points (the first to twelfth particles or the like) as input and outputs data representing movement of the plurality of representative points (the first to twelfth particles or the like). The learning model predicts at least one of positions, speeds, momenta, and accelerations of the plurality of representative points without directly performing simulation to reproduce a physical phenomenon.

In this way, by simulating movement of the model representing the first operation subject T1 in conformity with any scheme and generating a learning model by supervised learning using a simulation result, it is possible to substitute a simulation having a large computation load with a prediction of the movement of the representative points by the learning model having a relatively small computation load. Thus, it is possible to reduce a computation load required for simulation of the movement of the operation subject and reduce a calculation amount.

§ 2 Configuration Example

[Hardware Configuration]

Figure 2:
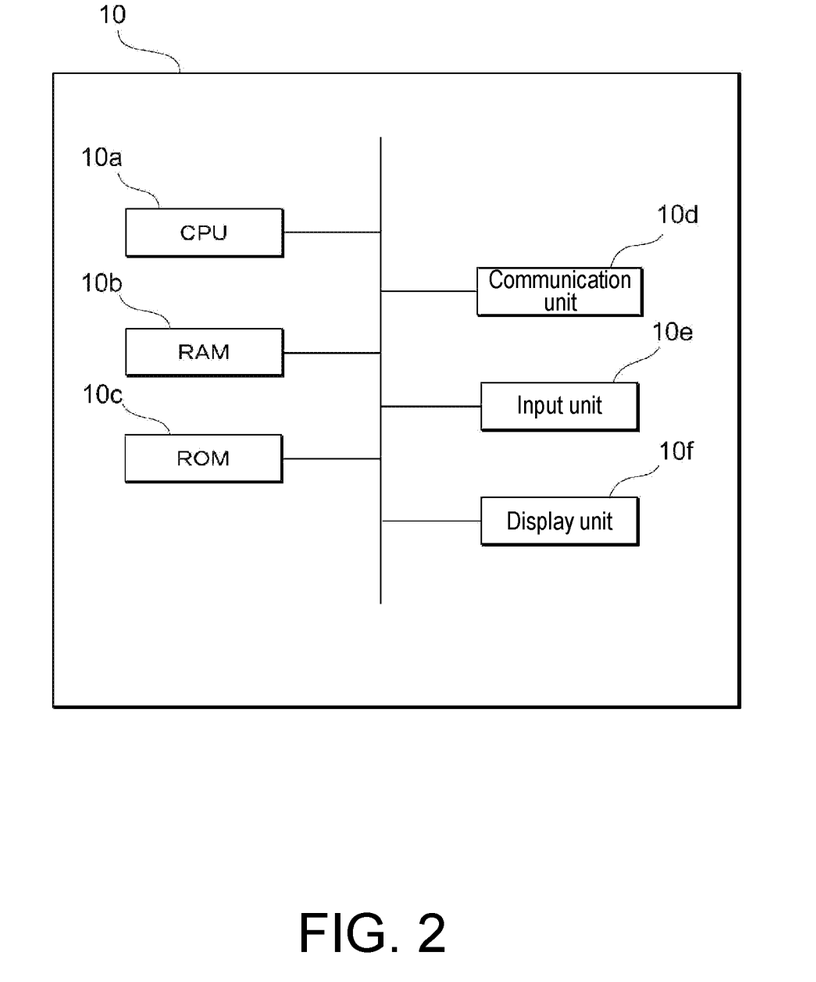
FIG. 2 is a diagram illustrating a hardware configuration of the simulation device according to the embodiment.

FIG. 2 is a diagram illustrating a hardware configuration of the simulation device 10 according to the embodiment. The simulation device 10 includes a central processing unit (CPU) 10a, a random access memory (RAM) 10b, a read-only memory (ROM) 10c, a communication unit 10d, an input unit 10e, and a display unit 10f. The CPU 10a, the RAM 10b, the ROM 10c, the communication unit 10d, the input unit 10e, and the display unit 10f are connected to be able to transmit and receive data one another via a bus. In this example, the simulation device 10 that is configured by a single computer will be described, but the simulation device 10 may be realized by combining a plurality of computers. The configuration illustrated in FIG. 2 is exemplary. The simulation device 10 may have a configuration other than these or may not have some of the configurations.

<CPU>

The CPU 10a is a processor included in the simulation device 10 and performs control of execution of programs stored in the RAM 10b and the ROM 10c and computation or processing of data. The CPU 10a is a computation unit that executes a program (a simulation program) that generates a learning model for reproducing a simulation result of movement of an operation subject in conformity with a known simulation scheme. The CPU 10a receives various kinds of data from the input unit 10e or the communication unit 10d and displays a computation result of the data on the display unit 10f or stores the computation result in the RAM 10b or the ROM 10c.

<RAM>

The RAM 10b is a storage unit included in the simulation device 10 and can rewrite data. The RAM 10b may be configured as, for example, as semiconductor storage element. The RAM 10b may store the simulation program executed by the CPU 10a or data or the like for configuring a robot or a surrounding environment in a simulation space. This is exemplary and the RAM 10b may store other data or may not store some of the data.

<ROM>

The ROM 10c is a storage unit included in the simulation device 10 and can read data. The ROM 10c may be configured as, for example, as semiconductor storage element. The ROM 10c may store, for example, the simulation program or unwritten data.

<Communication Unit>

The communication unit 10d is an interface that connects the simulation device 10 to another device. The communication unit 10d may be connected to a communication network such as a local area network (LAN) or the Internet.

<Input Unit>

The input unit 10e receives data from a user as input and may include, for example, a pointing device such as a mouse, a keyboard, and a touch panel.

<Display Unit>

The display unit 10f visually displays a computation result obtained by the CPU 10a and may be configured by, for example, a liquid crystal display (LCD). The display unit 10f may display a simulation result of an operation subject or an entire simulation result including a robot and an operation subject.

Figure 3:
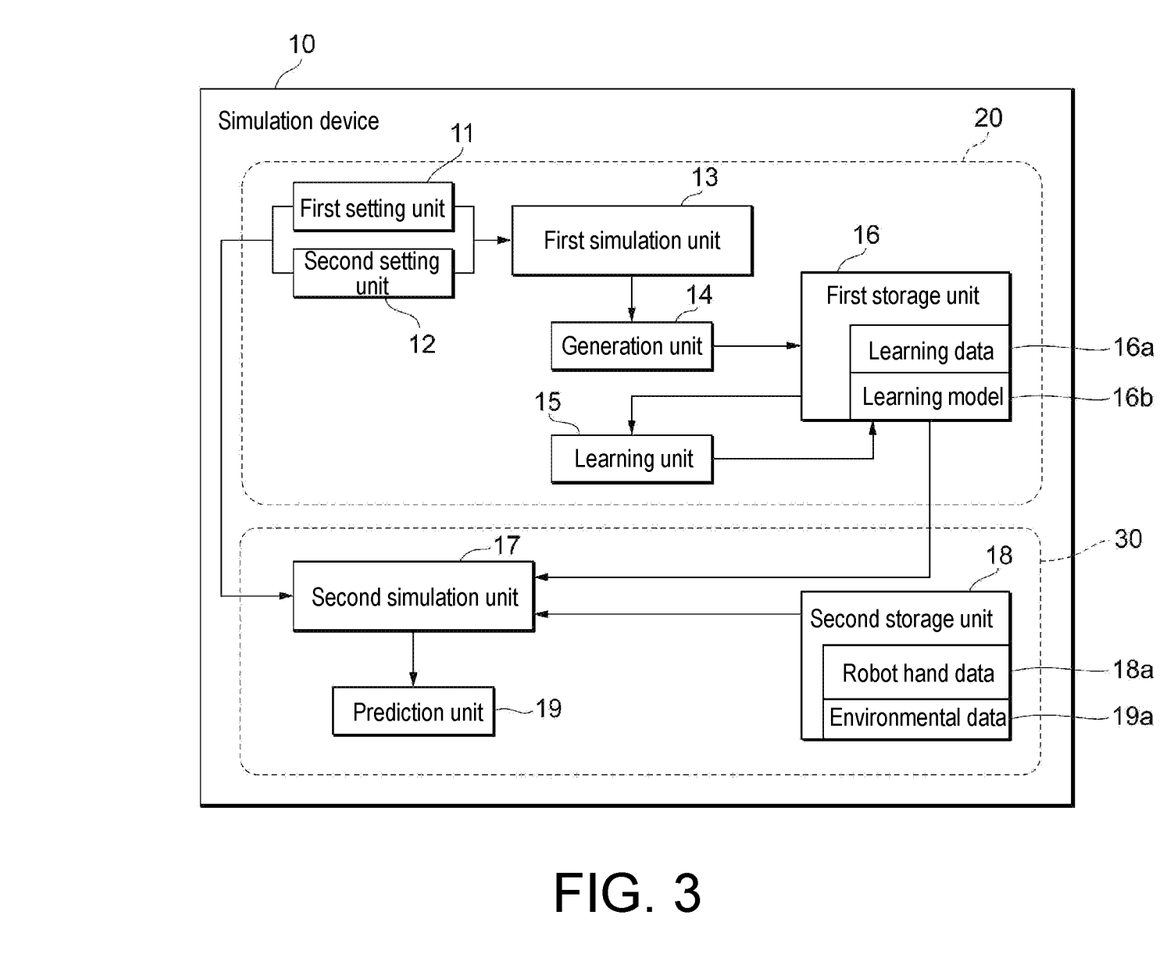
FIG. 3 is a diagram illustrating a functional configuration of the simulation device according to the embodiment.

The simulation program may be stored in a computer-readable storage medium such as the RAM 10b or the ROM 10c to be supplied or may be supplied via a communication network connected by the communication unit 10d. In the simulation device 10, actions of a first processing unit 20 and a second processing unit 30 to be described with reference to the following drawings are realized by causing the CPU 10a to execute the simulation program. The physical configurations are exemplary and may not necessarily be independent configurations. For example, the simulation device 10 may include a large-scale integration (LSI) in which the CPU 10a and the RAM 10b or the ROM 10c are integrated.

[Functional Configuration]

FIG. 3 is a diagram illustrating a functional configuration of the simulation device 10 according to the embodiment. The simulation device 10 includes the first processing unit 20 and the second processing unit 30. The first processing unit 20 performs a process of generating a learning model for predicting movement of an operation subject. The second processing unit 30 performs entire simulation including the robot and the operation subject using the generated learning model. The first processing unit 20 includes a first setting unit 11, a second setting unit 12, a first simulation unit 13, a generation unit 14, a learning unit 15, and a first storage unit 16. The second processing unit 30 includes a second simulation unit 17, a second storage unit 18, and a prediction unit 19.

<First Setting Unit>

The first setting unit 11 sets framing conditions for a model representing an operation subject. Here, for example, the operation subject may be a subject directly gripped by a robot hand, a subject indirectly gripped by the robot hand, a subject directly or indirectly operated by an end effector of a robot which is not limited to a hand, or a subject directly or indirectly gripped by a person. The framing conditions for the model include physical conditions for moving a model representing the operation subject in a simulation space similarly to the reality and may include either conditions representing flexibility of the operation subject or conditions representing viscosity. The operation subject may include any of a flexible object, a liquid, or a gas. The flexible object has flexibility and includes, for example, a cable formed of rubber, paper, or cloth. When the operation subject is a liquid or a gas, a container in which the liquid or the gas which is an operation subject is stored may be gripped by a robot. When the operation subject is a gas, a nozzle ejecting the gas which is an operation subject may be gripped by the robot to spray the gas to another member.

By causing the simulation device 10 according to the embodiment to generate a learning model for predicting movement of representative points of an operation subject, it is possible to predict the movement of the representative points of the operation subject through computation by a learning model having a relatively small computation load even when the operation subject is, for example, an operation subject such as a flexible object, a liquid, and a gas having a large computation load of simulation. Thus, it is possible to reduce a computation load required for simulation of movement of the operation subject and reduce a computation amount.

<Second Setting Unit>

The second setting unit 12 sets conditions for external force applied to an operation subject. The external force applied to the operation subject may include external force directly or indirectly added to the operation subject by a robot. The external force applied to the operation subject may include, for example, external force added due to a configuration other than a robot, such as external force added by a transport device.

<First Simulation Unit>

The first simulation unit 13 simulates movement of an operation subject under the framing conditions for a model representing the operation subject and the conditions for external force applied to the operation subject. The first simulation unit 13 may simulate movement of the operation subject using any scheme. For example, a particle method or a finite element method may be used.

<Generation Unit>

The generation unit 14 generates learning data including the framing conditions for the model representing the operation subject, the conditions for external force applied to the operation subject, and data representing movement of the plurality of representative points located on the surface of the operation subject during simulation by the first simulation unit 13. The learning data generated by the generation unit 14 may be stored as learning data 16*a* in the first storage unit 16. Here, the plurality of representative points may be located any portions of the operation subject. When the representative points are located on the surface of the operation subject, the representative points can be represented by representative points at which movement of the external shape of the operation subject is relatively small. The generation unit 14 may generate not only learning data including data representing movement of the plurality of representative points located on the surface of the operation subject but also learning data including the framing conditions for the model representing the operation subject, the conditions for external force applied to the operation subject, and data representing movement of the plurality of representative points located on a part of the operation subject during simulation by the first simulation unit 13.

The generation unit 14 may generate learning data that includes the framing conditions for the model representing the operation subject, the conditions for external force applied to the model representing the operation subject at a predetermined time of the simulation by the first simulation unit 13, and data representing movement of the plurality of representative points at the predetermined time as input data and includes data representing movement of the plurality of representative points at a time after a predetermined time passes from the predetermined time as output data. Here, the predetermined time may be a minimum time or several multiples of the minimum time in the simulation by the first simulation unit 13. In this way, it is possible to predict movement of the representative points by the learning model after the predetermined time passes. Thus, by repeatedly performing the prediction by the learning model, it is possible to predict movement of the representative points at any time. The input data included in the learning data is data input to the learning model in supervised learning of the learning model. The output data included in the learning data is data compared with output of the learning model in the supervised learning of the learning model and is data indicating a correct answer.

When the operation subject is a liquid, the surface of the operation subject may be the liquid surface of the liquid and movement of the plurality of representative points may be represented as movement of the liquid surface at the plurality of positions in the perpendicular direction. By predicting the movement of the plurality of representative points located on the liquid surface of the liquid by the learning model, it is possible to further decrease a computation load of the learning model than in the case of prediction of movement of the entire liquid, and thus it is possible to reduce a computation amount.

When the operation subject is a liquid, the first simulation unit 13 may simulate movement of a plurality of particles using a model obtained by decomposing the liquid which is the operation subject into the plurality of particles. In this case, the framing conditions for the model representing the operation subject may include conditions regarding the number of particles, the sizes of the particles, and interaction between the particles. The first simulation unit 13 may simulate movement of the plurality of particles representing the operation subject by a particle method. Data representing movement of a plurality of representative points located on the liquid surface of the liquid may be data representing movement of some particles located on the liquid surface of the liquid at a predetermined time of the simulation by the first simulation unit 13 among the plurality of particles. In this way, it is possible to generate a learning model for reproducing the movement of the particles located on the liquid surface in a result obtained by simulating movement of the entire liquid by a particle model. Thus, it is possible to further reduce a computation load of the learning model than in the case of prediction of movement of the entire liquid, and it is possible to reduce a computation amount.

The first simulation unit 13 may simulate movement of nodal points using a model obtained by decomposing an operation subject into a plurality of constituents connected by nodal points. In this case, framing conditions for a model representing the operation subject may include conditions regarding the number of constituents and the number of nodal points, the sizes of the constituents, and the shapes of the constituents. The first simulation unit 13 may simulate movement of the plurality of nodal points representing the operation subject by a finite element method. The plurality of representative points may be located on the surface of the operation subject. The number of plurality of representative points located on the surface of the operation subject may be less than the number of nodal points. It is possible to generate a learning model for reproducing movement of some nodal points located on the surface of the operation subject in a result obtained by simulating the movement of the entire operation subject by the finite element method. Thus, it is possible to further reduce a computation load of the learning model than in the case of prediction of movement of all the nodal points representing the operation subject, and it is possible to reduce a computation amount.

<Learning Unit>

The learning unit 15 generates, by supervised learning using the learning data, a learning model that takes the framing conditions of the model representing the operation subject, the conditions for external force applied to the operation subject, and initial conditions of the plurality of representative points located on the surface of the operation subject as input and outputs the data representing the movement of the plurality of representative points. The learning model generated by the learning unit 15 may be stored as the learning model 16*b* in the first storage unit 16. The learning model 16*b* generated by the learning unit 15 may be a model using, for example, a neural network. The learning model 16*b* may be generated by optimizing weighting parameters or the like of the neural network with regard to the learning data by a back propagation error method.

<Second Simulation Unit>

The second simulation unit 17 simulates movement of a robot. In the embodiment, the second simulation unit 17 simulates movement of a robot hand. The second simulation unit 17 simulates an action of the robot hand in a simulation space with reference to robot hand data 18*a* stored in the second storage unit 18. The robot hand data 18*a* may include taught data regarding a trajectory of the robot hand, data regarding dimensions of an arm included in the robot hand, and data regarding torque of a servomotor included in the robot hand. The second simulation unit 17 may simulate a surrounding environment along with the action of the robot hand with reference to environmental data 18*b* stored in the second storage unit 18. The environmental data 18*b* may include data regarding temperature, humidity, and the like of an environment in which the robot hand is installed, data regarding a transport device, a processing device, or the like used along with the robot hand, and data regarding a worker or an obstacle which can interfere with the robot hand. The second simulation unit 17 may simulate an action of the robot hand so that the robot hand cooperates with the transport device or the processing device while avoiding interference with the worker or the obstacle.

<Prediction Unit>

The prediction unit 19 inputs the conditions for external force added to the operation subject by the robot and the framing conditions for the model representing the operation subject during the simulation by the second simulation unit 17 into the learning model 16*b* and predicts movement of the plurality of representative points. The prediction unit 19 predicts the movement of the plurality of representative points located on the surface of the operation subject without directly simulating movement of the model representing the operation subject based on data output from the learning model 16*b*.

The second simulation unit 17 combines the movement of the plurality of representative points predicted by the prediction unit 19 and the simulated movement of the robot hand. For example, when the operation subject is a liquid which is in a container and an action of gripping and moving the container by the robot hand is simulated, the second simulation unit 17 performs entire simulation including the robot hand and the operation subject by causing the second simulation unit 17 to simulate an action of the robot hand, causing the prediction unit 19 to predict movement of the liquid surface of the liquid which is in the container, and combining the action and the movement. In this way, by predicting movement of the representative points of the model representing the operation subject with a relatively small computation load by the learning model and combining the movement of the robot hand with a simulation result in conformity with any scheme, it is possible to reduce a computation load required for entire simulation including the robot hand and the operation subject, and thus it is possible to reduce a computation amount.

§ 3 Operation Example

Figure 4:
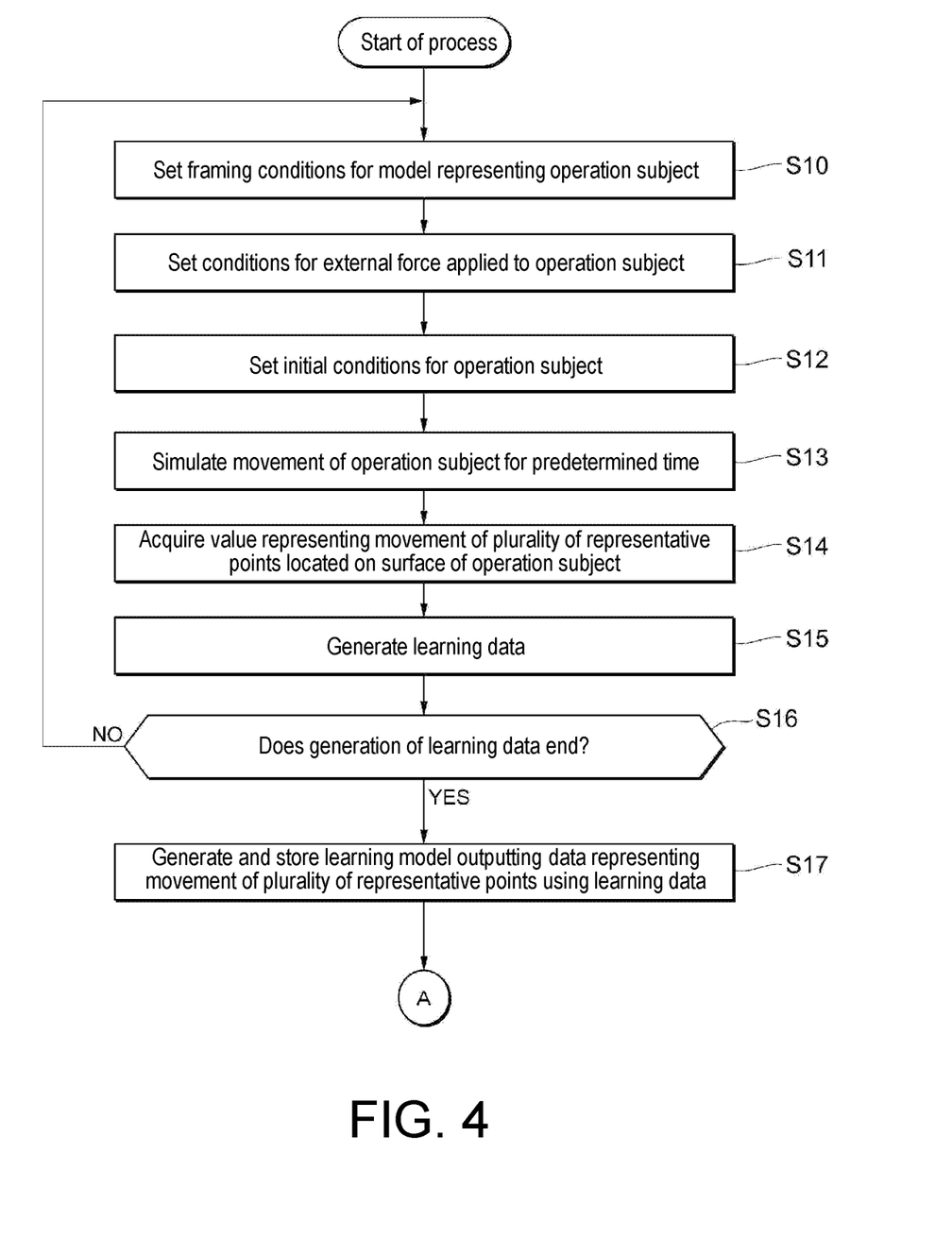
FIG. 4 is a flowchart illustrating a first process performed by the simulation device according to the embodiment.

FIG. 4 is a flowchart illustrating a first process performed by the simulation device 10 according to the embodiment. The first process is a process performed by the first processing unit 20 of the simulation device 10 and is a process of generating a learning model for predicting movement of the plurality of representative points of the operation subject.

First, the simulation device 10 sets the framing conditions for the model representing the operation subject (S10), sets the conditions for external force applied to the operation subject (S11), and sets the initial conditions for the operation subject (S12).

Thereafter, the simulation device 10 simulates movement of the operation subject for a predetermined time (S13). Here, the predetermined time may be a minimum time during the simulation or may be several multiples of the minimum time.

The simulation device 10 acquires a value representing the movement of the plurality of representative points located on the surface of the operation subject (S14). Then, the simulation device 10 generates the learning data that includes the framing conditions for the model representing the operation subject, the conditions for external force at an initial time of the simulation, and data representing movement of the plurality of the representative points at the initial time as input data and includes data representing movement of the plurality of representative points at a time after a predetermined time passes from the initial time as output data (S15).

Thereafter, when the generation of the learning data does not end (NO in S16), the simulation device 10 performs the setting of the framing conditions (S10), the setting of the conditions for external force (S11), and the setting of the initial conditions (S12) again, simulates movement of the operation subject (S13), and generates the learning data (S14 and S15). Here, when the same operation subject is simulated, the setting of the framing conditions (S10) may be omitted. When continuous movement of the same operation subject is simulated, the initial conditions for the operation subject in subsequent simulation may be set based on data representing movement of the operation subject obtained by the immediately previous simulation.

Conversely, when the generation of the learning data ends (YES in S16), the simulation device 10 generates and stores the learning model that outputs the data representing the movement of the plurality of representative points using the learning data (S17). Then, the first process ends.

Figure 5:
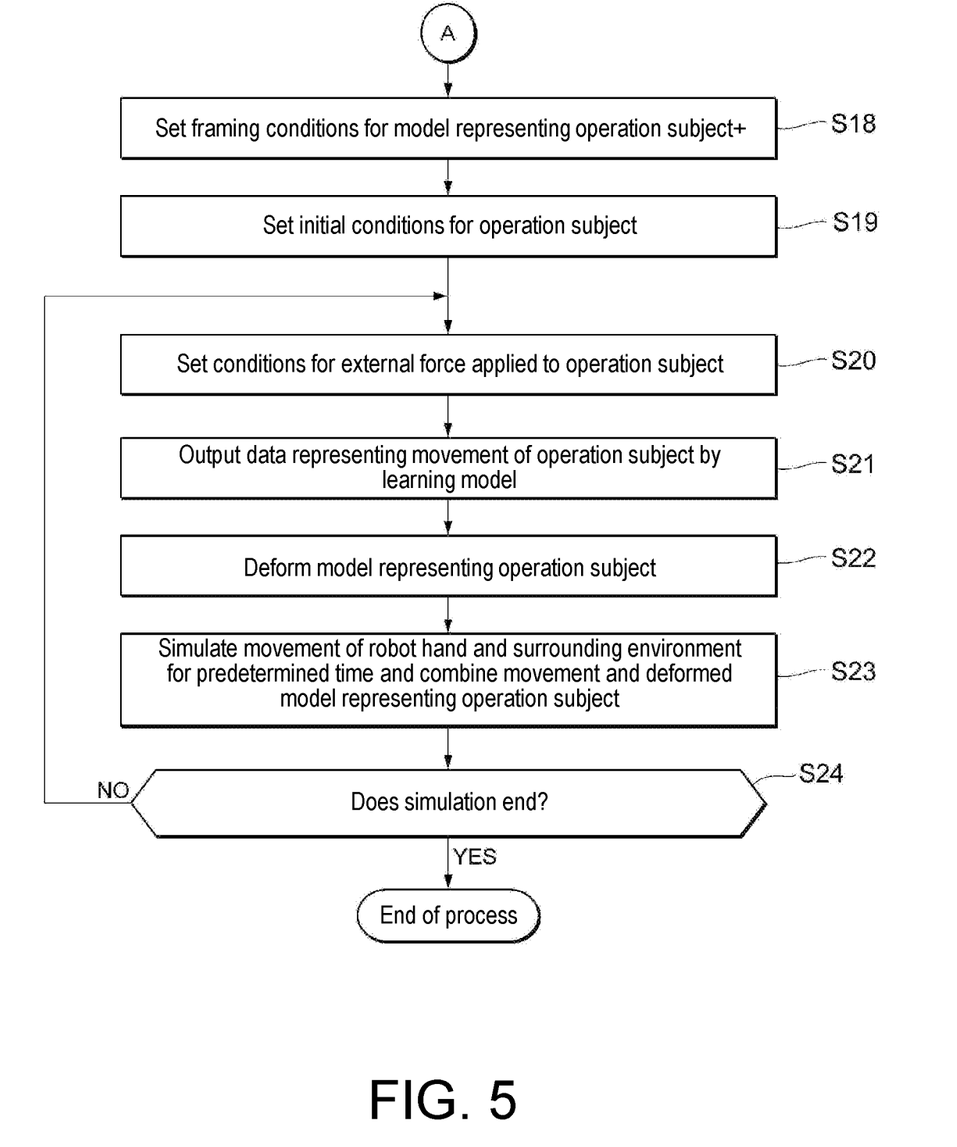
FIG. 5 is a flowchart illustrating a second process performed by the simulation device according to the embodiment.

FIG. 5 is a flowchart illustrating a second process performed by the simulation device 10 according to the embodiment. The second process is a process performed by the second processing unit 30 of the simulation device 10 and is a process of simulating the entirety including the robot hand and the operation subject using the learning model generated through the first process.

First, the simulation device 10 sets the framing conditions for the model representing the operation subject (S18), sets the initial conditions for the operation subject (S19), and sets the conditions for external force applied to the operation subject (S20). Here, the conditions for external force applied to the operation subject may be determined based on an action scheduled for the robot hand.

Thereafter, the simulation device 10 outputs the data representing movement of the operation subject by the learning model (S21) and deforms the model representing the operation subject in the simulation space (S22). The simulation device 10 simulates movement of the robot hand and the surrounding environment for a predetermined time and combines the movement with the deformed model representing the operation subject (S23). Here, the predetermined time may be the same as the predetermined time in the first process and may be a minimum time during the simulation or may be several multiples of the minimum time.

When the simulation does not end (NO in S24), the simulation device 10 sets the conditions for external force applied to the operation subject based on the subsequent action of the robot hand (S20), predicts movement of the operation subject by the learning model (S21), deforms the model representing the operation subject (S22), and combines the movement of the robot hand and the surrounding environment with the deformed model representing the operation subject (S23).

Conversely, when the simulation ends (YES in S24), the simulation device 10 writes a simulation result on the storage unit or displays the simulation result on a display unit, and then the second process ends.

Figure 6:
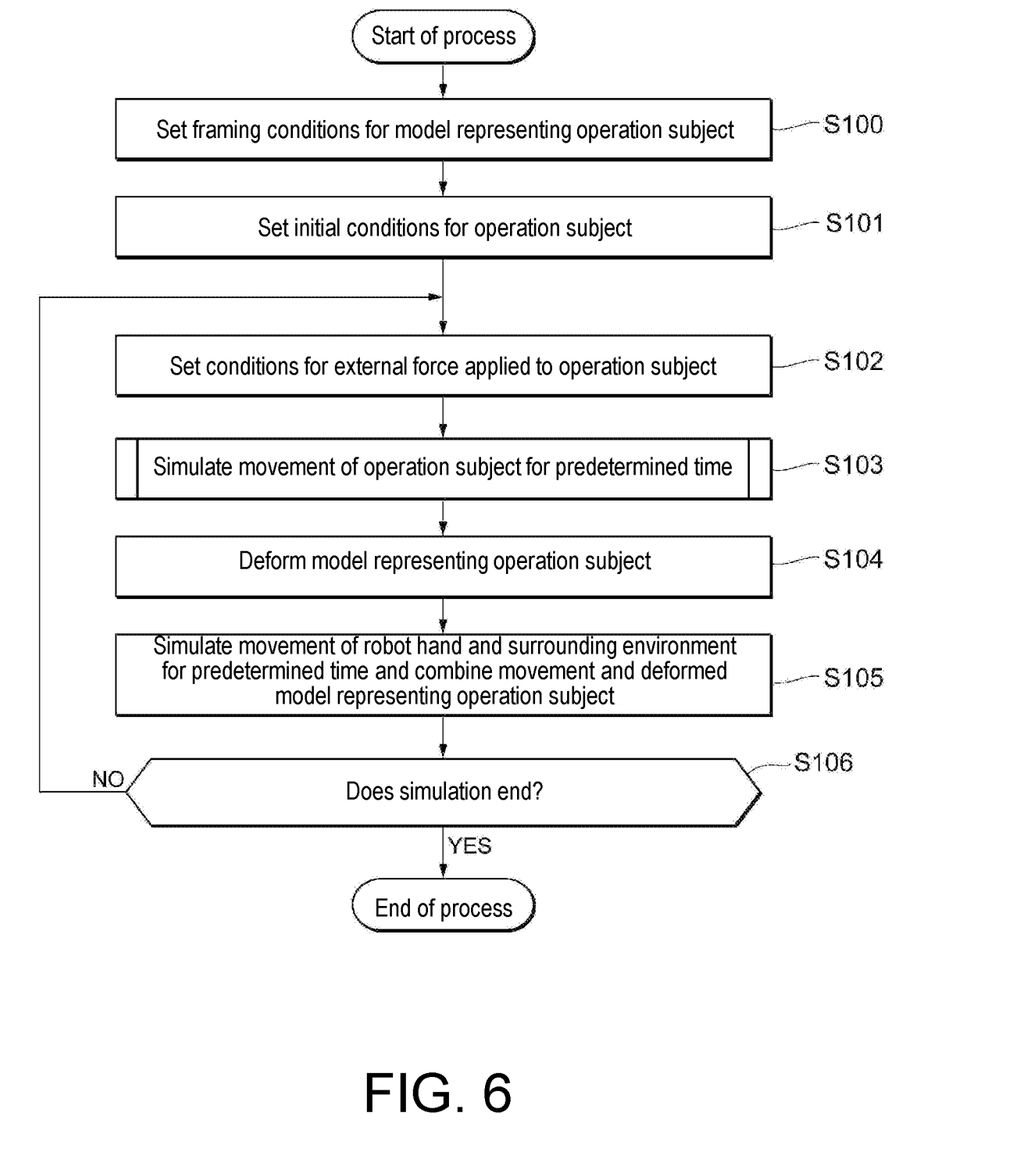
FIG. 6 is a flowchart illustrating a process performed by a simulation device of the related art.

FIG. 6 is a flowchart illustrating a process performed by a simulation device of the related art. The process performed by the simulation device of the related art is different from the second process performed by the simulation device 10 according to the embodiment in that a process of simulating movement of an operation subject for a predetermined time (S103) is performed.

In the process performed by the simulation device of the related art, the framing conditions for a model representing the operation subject is first set (S100), the initial conditions for the operation subject is set (S101), and the conditions for external force applied to the operation subject is set (S102). Here, the conditions for external force applied to the operation subject may be determined based on an action scheduled for the robot hand.

Thereafter, the simulation device of the related art simulates movement of the operation subject for a predetermined time (S103). Here, the process of simulating the movement of the operation subject for the predetermined time (S103) is a process performed by a finite element method or a particle method, a computation load is generally large, and a relatively long time is required until a result is obtained. The simulation device of the related art deforms the model representing the operation subject in a simulation space in accordance with a simulation result of the movement of the operation subject (S104), simulates the movement of the robot hand and the surrounding environment for the predetermined time, and combines the movement and the deformed model presenting the operation subject (S105).

When the simulation does not end (NO in S106), the simulation device of the related art sets the conditions for external force applied to the operation subject based on the subsequent action of the robot hand (S102), simulates the movement of the operation subject for the predetermined time (S103), deforms the model representing the operation subject (S104), and combines the movement of the robot hand and the surrounding environment with the deformed model representing the operation subject (S105).

In this way, the simulation device of the related art simulates movement of the operation subject for the predetermined time by the finite element method or the particle method whenever the simulation is advanced by a predetermined time. On the other hand, the simulation device 10 according to the embodiment calculates movement of the representative points of the operation subject by the learning model whenever the simulation is advance by a predetermined time. Due to this difference, the simulation device 10 according to the embodiment can further reduce a computation load required for simulation of movement of the operation subject than in the simulation device of the related art, and thus it is possible to reduce a computation amount.

Figure 7:
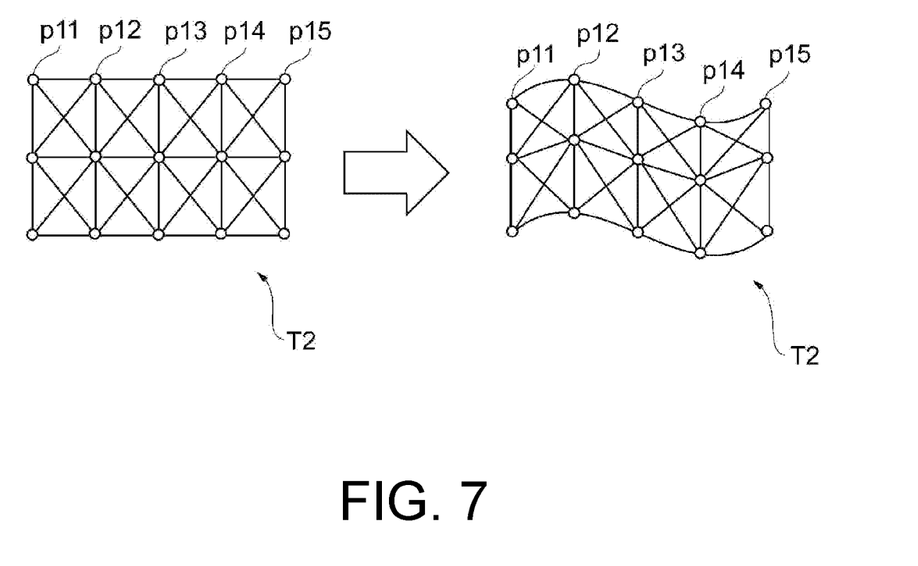
FIG. 7 is a schematic diagram illustrating movement of a second operation subject simulated by the simulation device according to the embodiment.

FIG. 7 is a schematic diagram illustrating movement of a second operation subject T2 simulated by the simulation device 10 according to the embodiment. The second operation subject T2 is paper or cloth which is a flexible object. The second operation subject T2 is gripped by a robot to operate. When the second operation subject T2 is gripped and moved by the robot, the simulation device 10 simulates an action of the robot moving the second operation subject T2 in a short time so that the second operation subject T2 which is a flexible object is not damaged or tangled. In FIG. 7, the second operation subject T2 which is in a still state is illustrated to the left and the second operation subject T2 gripped and deformed by the robot is illustrated to the right.

The simulation device 10 sets framing conditions for a model representing the second operation subject T2 and conditions for external force applied to the second operation subject T2, and simulates movement of the second operation subject T2 in conformity with a known simulation scheme under these conditions. For example, the simulation device 10 may simulate movement of a plurality of nodal points in conformity with a so-called finite element method using a model obtained by decomposing the second operation subject T2 which is a flexible object into the plurality of constituents connected by nodal points. In this case, the framing conditions for the model may include conditions regarding the number of constituents, the number of nodal points, the sizes of the constituent elements, and the shapes of the constituents. The conditions for external force may include conditions for force added by the robot.

The simulation device 10 may use, as learning data, data representing movement of some nodal points located on the surface of the second operation subject T2 in movement of a plurality of nodal points simulated in conformity with the finite element method. Here, the data representing movement of the nodal points may include data representing at least one of the positions, speeds, momenta, and accelerations of the nodal points.

In FIG. 7, a first nodal point p11, a second nodal point p12, a third nodal point p13, a fourth nodal point p14, and a fifth nodal point p15 are illustrated as some nodal points located on the surface of the second operation subject T2. These nodal points are exemplary and the nodal points serving as a plurality of representative points may include other points. In this example, when the second operation subject T2 is gripped by the robot, a left state in which the first nodal point p11, the second nodal point p12, the third nodal point p13, the fourth nodal point p14, and the fifth nodal point p15 are located on a straight line transitions to a right state in which the positions of the first nodal point p11, the second nodal point p12, the third nodal point p13, the fourth nodal point p14, and the fifth nodal point p15 scatter.

The simulation device 10 generates learning data including framing conditions for a model representing the second operation subject T2, conditions for external force applied to the second operation subject T2, and data representing movement of the plurality of representative points (the first to fifth nodal points) located on the surface of the second operation subject T2 during simulation. The simulation device 10 generates, by supervised learning using the learning data, a learning model that takes the framing conditions for the model representing the second operation subject T2, the conditions for external force applied to the second operation subject T2, and initial conditions of the plurality of representative points (the first to fifth nodal points) as input and outputs data representing movement of the plurality of representative points (the first to fifth nodal points). The learning model predicts at least one of positions, speeds, momenta, and accelerations of the plurality of representative points without directly performing simulation to reproduce a physical phenomenon.

In this way, by simulating movement of the model representing the second operation subject T2 in conformity with any scheme and generating a learning model by supervised learning using a simulation result, it is possible to substitute a simulation having a large computation load with a prediction of the movement of the representative points by the learning model having a relatively small computation load. Thus, it is possible to reduce a computation load required for entire simulation including the robot and the operation subject and reduce a calculation amount.

The above-described embodiments facilitate understanding of the present invention and is not interpreted as limiting the present invention. Each element, disposition of the element, a material of the element, conditions for the element, the shape of the element, the size of the element, and the like in the embodiment are not limited to those which are exemplary, and can be appropriately changed. The configurations according to the different embodiments can be replaced or combined partially.

Supplement 1

A simulation device (10) including:
- a first setting unit (11) configured to set framing conditions for a model representing an operation subject;
- a second setting unit (12) configured to set conditions for external force applied to the operation subject;
- a first simulation unit (13) configured to simulate movement of the operation subject under the framing conditions and the condition for external force;
- a generation unit (14) configured to generate learning data including the framing conditions, the conditions for external force, and data representing movement of a plurality of representative points located on a surface of the operation subject during simulation by the first simulation unit (13); and
- a learning unit (15) configured to, by supervised learning using the learning data, generate a learning model that takes the framing conditions, the conditions for external force, and initial conditions of the plurality of representative points as input and outputs the data representing the movement of the plurality of representative points.

Supplement 2

The simulation device (10) according to claim 1, wherein the generation unit (14) generates the learning data that includes the framing conditions, the conditions for external force at a predetermined time of the simulation by the first simulation unit (13), and data representing movement of the plurality of representative points at the predetermined time as input data and includes data representing movement of the plurality of representative points at a time after a predetermined time passes from the predetermined time as output data.

Supplement 3

The simulation device (10) according to claim 1 or 2, further comprising:
- a second simulation unit (17) configured to simulate movement of a robot; and
- a prediction unit (19) configured to input the framing conditions and conditions for external force added to the operation subject by the robot during simulation by the second simulation unit (17) to the learning model and configured to predict movement of the plurality of representative points,
- wherein the second simulation unit (17) combines the movement of the plurality of representative points predicted by the prediction unit (19) and the simulated movement of the robot.

Supplement 4

The simulation device (10) according to any one of claims 1 to 3, wherein the operation subject includes one of a flexible object, a liquid, and a gas.

Supplement 5

The simulation device (10) according to claim 4, wherein, when the operation subject is a liquid, the surface of the operation subject is a liquid surface of the liquid and the movement of the plurality of representative points are indicated by movement of the liquid surface in a perpendicular direction of the liquid surface at a plurality of positions.

Supplement 6

The simulation device (10) according to claim 5,
- wherein the first simulation unit (13) uses the model obtained by decomposing the liquid into a plurality of particles to simulate movement of the plurality of particles, and
- wherein the data representing the movement of the plurality of representative points is data representing movement of some particles located on a liquid surface of the liquid at a predetermined time of simulation by the first simulation unit (13) among the plurality of particles.

Supplement 7

The simulation device (10) according to any one of claims 1 to 6, wherein the framing conditions include one of a condition representing flexibility of the operation subject and a condition representing viscosity.

Supplement 8

The simulation device (10) according to any one of claims 1 to 7,
- wherein the first simulation unit (13) uses the model obtained by decomposing the operation subject into a plurality of constituents connected by nodal points to simulate movement of the nodal points, and
- wherein the number of plurality of representative points is less than the number of nodal points.

Supplement 9

A simulation method comprising:
- setting framing conditions for a model representing an operation subject;
- setting conditions for external force applied to the operation subject;
- simulating movement of the operation subject under the framing conditions and the conditions for external force;
- generating learning data including the framing conditions, the conditions for external force, and data representing movement of a plurality of representative points located on a surface of the operation subject during simulation by the first simulation unit (13); and
- generating, by supervised learning using the learning data, a learning model that takes the framing conditions, the conditions for external force, and initial conditions of the plurality of representative points as input and outputs the data representing the movement of the plurality of representative points.

Supplement 10

A computer-readable storage medium storing a simulation program causing a processor included in a simulation device (10) to function as:
- a first setting unit (11) configured to set framing conditions for a model representing an operation subject;

a second setting unit (12) configured to set conditions for external force applied to the operation subject;

a first simulation unit (13) configured to simulate movement of the operation subject under the framing conditions and the condition for external force;

a generation unit (14) configured to generate learning data including the framing conditions, the conditions for external force, and data representing movement of a plurality of representative points located on a surface of the operation subject during simulation by the first simulation unit (13); and a learning unit (15) configured to, by supervised learning using the learning data, generate a learning model that takes the framing conditions, the conditions for external force, and initial conditions of the plurality of representative points as input and outputs the data representing the movement of the plurality of representative points.

The invention claimed is:

1. A simulation method comprising:

setting framing conditions for a model representing an operation subject, wherein the operation subject is liquid in a container, and wherein the framing conditions are physical conditions for moving the model representing the operation subject in a simulation space in a same manner as in reality and comprise conditions representing flexibility or viscosity of the operation subject;

setting conditions for external force applied to the operation subject comprising conditions for force added by a robot and force added by a boundary of the container;

simulating movement of the operation subject under the framing conditions and the conditions for external force;

generating learning data including the framing conditions, the conditions for external force, and data representing movement of a plurality of representative points located on a liquid surface at a plurality of positions in a perpendicular direction during simulation of the movement of the operation subject;

generating, by supervised learning using the learning data, a learning model that takes the framing conditions, the conditions for external force, and initial conditions of the plurality of representative points located on the liquid surface as input and outputs data representing movement of the plurality of representative points located on the liquid surface;

simulating a movement of a robot;

inputting the framing conditions and conditions for external force added to the operation subject by the robot during simulation of the movement of the robot to the learning model and predicting movement of the plurality of representative points located on the liquid surface; and combining the predicted movement of the plurality of representative points located on the liquid surface and the simulated movement of the operation subject.

2. A computer-readable storage medium storing a simulation program causing a processor included in a simulation device to:

set framing conditions for a model representing an operation subject, wherein the operation subject is liquid in a container, and wherein the framing conditions are physical conditions for moving the model representing the operation subject in a simulation space in a same manner as in reality and comprise conditions representing flexibility or viscosity of the operation subject;

set conditions for external force applied to the operation subject comprising conditions for force added by a robot and force added by a boundary of the container;

simulate movement of the operation subject under the framing conditions and the conditions for external force;

generate learning data including the framing conditions, the conditions for external force, and data representing movement of a plurality of representative points located on a liquid surface at a plurality of positions in a perpendicular direction during simulation of the movement of the operation subject;

by supervised learning using the learning data, generate a learning model that takes the framing conditions, the conditions for external force, and initial conditions of the plurality of representative points located on the liquid surface as input and outputs data representing movement of the plurality of representative points located on the liquid surface;

simulate a movement of a robot;

input the framing conditions and conditions for external force added to the operation subject by the robot during simulation of the movement of the robot to the learning model and predict movement of the plurality of representative points located on the liquid surface; and combine the predicted movement of the plurality of representative points located on the liquid surface and the simulated movement of the operation subject.

3. A simulation device comprising:

a processor, configured to:

set framing conditions for a model representing an operation subject, wherein the operation subject is liquid in a container, and wherein the framing conditions are physical conditions for moving the model representing the operation subject in a simulation space in a same manner as in reality and comprise conditions representing flexibility or viscosity of the operation subject;

set conditions for external force applied to the operation subject comprising conditions for force added by a robot and force added by a boundary of the container;

simulate movement of the operation subject under the framing conditions and the conditions for external force;

generate learning data including the framing conditions, the conditions for external force, and data representing movement of a plurality of representative points located on a liquid surface at a plurality of positions in a perpendicular direction during simulation of the movement of the operation subject;

by supervised learning using the learning data, generate a learning model that takes the framing conditions, the conditions for external force, and initial conditions of the plurality of representative points located on the liquid surface as input and outputs data representing movement of the plurality of representative points located on the liquid surface;

simulate a movement of a robot;

input the framing conditions and conditions for external force added to the operation subject by the robot during simulation of the movement of the robot to the learning model and predict movement of the plurality of representative points located on the liquid surface; and combine the predicted movement of the plurality of representative points located on the liquid surface and the simulated movement of the operation subject.

4. The simulation device according to claim 3, wherein the processor generates the learning data that includes the framing conditions, the conditions for external force at a predetermined time of simulation of the movement of the operation subject, and data representing movement of the plurality of representative points located on the liquid surface at the predetermined time as input data and includes data representing movement of the plurality of representative points located on the liquid surface at a time after a predetermined time passes from the predetermined time as output data.

5. The simulation device according to claim 3, wherein the processor uses the model obtained by decomposing the liquid into a plurality of particles to simulate movement of the plurality of particles, and wherein data representing movement of the plurality of representative points located on the liquid surface is data representing movement of some particles located on the liquid surface of the liquid at a predetermined time of simulation of the movement of the operation subject among the plurality of particles.

6. The simulation device according to claim 3, wherein the processor uses the model obtained by decomposing the operation subject into a plurality of components represented by nodal points to simulate movement of the nodal points, and wherein the number of the plurality of representative points is less than the number of the nodal points.

7. The simulation device according to claim 3, wherein the processor partitions an inside of the container into three-dimensional lattice, selects a particle with a largest value in the perpendicular direction with respect to each lattice cell of a plane crossing the container, and generates the data representing movement of a part of the particles located on the liquid surface.

\* \* \* \* \*